(12) United States Patent  
Chuchem et al.

(10) Patent No.: US 8,819,502 B2  
(45) Date of Patent: *Aug. 26, 2014

(54) DETERMINISTIC DATA VERIFICATION IN STORAGE CONTROLLER

(71) Applicant: International Business Machines Corporation, Armonk, NY (US)

(72) Inventors: Yair G. Chuchem, Omer (IL); Adi Goldfarb, Tel Aviv (IL); Zohar Zilberman, Kiryat Haim (IL)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/947,344

(22) Filed: Jul. 22, 2013

(65) Prior Publication Data  
US 2013/0305105 A1     Nov. 14, 2013

Related U.S. Application Data

(63) Continuation of application No. 12/845,628, filed on Jul. 28, 2010, now Pat. No. 8,495,439.

(51) Int. Cl.  
*G06F 11/00* (2006.01)

(52) U.S. Cl.  
USPC .......................... 714/719; 714/720; 714/739

(58) Field of Classification Search  
CPC  G11C 29/10; G11C 29/56004; G06F 11/263; G06F 12/0815; G06F 11/3672; G06F 13/1668; G06F 17/30339; G06F 2221/034; G06F 12/0284; G06F 12/109; G06F 13/1621  
USPC .......................... 714/718–721, 738–744, 54; 711/141–146

See application file for complete search history.

(56) References Cited

U.S. PATENT DOCUMENTS

| | | | | |
|---|---|---|---|---|
| 5,822,513 | A | * | 10/1998 | Ofer et al. ........................ 714/42 |
| 7,114,112 | B2 | | 9/2006 | Griffin et al. |
| 2002/0095623 | A1 | * | 7/2002 | Bruce ............................... 714/42 |
| 2008/0005465 | A1 | * | 1/2008 | Matthews ....................... 711/113 |

* cited by examiner

*Primary Examiner* — Scott Baderman  
*Assistant Examiner* — Jason Bryan  
(74) *Attorney, Agent, or Firm* — Griffiths & Seaton PLLC

(57) ABSTRACT

Exemplary method, system, and computer program embodiments for performing deterministic data verification by a storage controller are provided. Each of a plurality of concurrent write tasks is configured to be placed in a plurality of overlapping data storage ranges by performing at least one of: implementing a data generation function for generating pseudo-random data using a data seed, and generating a range map, the range map utilized as a lookup data structure to verify a chronological order for performing the plurality of concurrent write tasks, wherein a data address space is first designated in the range map as undetermined. Each of a plurality of read tasks is analyzed by comparing data read from a sub range in the plurality of overlapping data storage ranges against the data seed associated with the sub range.

20 Claims, 6 Drawing Sheets

DETERMINISTIC DATA VERIFICATION IN STORAGE CONTROLLER

PRIORITY CLAIM

This application is a Continuation of U.S. patent application Ser. No. 12/845,628, filed on Jul. 28, 2010.

BACKGROUND OF THE INVENTION

1. Field of the Invention

The present invention relates in general to computers, and more particularly to apparatus, method and computer program product embodiments for performing deterministic data verification in a storage controller operational in a data storage subsystem.

2. Description of the Related Art

Computers and computer systems are found in a variety of settings in today's society. Computing environments and networks may be found at home, at work, at school, in government, and in other settings. Computing environments increasingly store data in one or more storage environments, which in many cases are remote from the local interface presented to a user.

These computing storage environments may use many storage devices such as disk drives, often working in concert, to store, retrieve, and update a large body of data, which may then be provided to a host computer requesting or sending the data. In some cases, a number of data storage subsystems are collectively managed as a single data storage system. These subsystems may be managed by host "sysplex" (system complex) configurations that combine several processing units or clusters of processing units. In this way, multi-tiered/multi-system computing environments, often including a variety of types of storage devices, may be used to organize and process large quantities of data.

SUMMARY OF THE DESCRIBED EMBODIMENTS

Storage architectures often include one or more storage controllers responsible for a certain number of storage devices under their control. In this regard, storage controllers facilitate providing one or more interfaces between the user and the storage devices while managing one or more storage aspects such as redundant array of independent disks (RAID) configurations, failover, replication, snapshots, and the like.

So-called load generation software packages are used to create an artificial workload of data reads and writes in order to test the functionality of storage controllers in a simulated operating environment. It is challenging to obtain optimal test coverage, however, of a particular storage environment due to a variety of internal and external factors. For example, currently it is difficult to determine if the data, read pursuant to the testing environment, is the correct data.

In view of the foregoing, a need exists for a mechanism whereby optimal test coverage may be applied to storage devices such as a storage controller, and accurate verification of such test coverage may be performed. Accordingly, various exemplary method, apparatus, and computer program embodiments for performing deterministic data verification by a storage controller operational in a computing storage environment are provided. In one embodiment, by way of example only, each of a plurality of concurrent write tasks are configured to be placed in a plurality of overlapping data storage ranges by performing at least one of implementing a data generation function for generating pseudo-random data using a data seed, and generating a range map, the range map utilized as a lookup data structure to verify a chronological order for performing the plurality of concurrent write tasks, wherein a data address space is first designated in the range map as undetermined, and the generating includes generating a plurality of nodes, wherein each node represents a range from a starting address offset to an ending address offset. Each of a plurality of read tasks is analyzed by comparing data read from a sub range in the plurality of overlapping data storage ranges against the data seed associated with the sub range.

In addition to the foregoing exemplary embodiment, various other method, apparatus, and computer program product embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

In the verification world of storage systems, two challenges emerge in the pursuit of optimal test coverage: scalability and computability. Scalability refers to the growth of the capacity of storage systems over time. A testing system failing to take scalability into account may not be useful in the future because it may not accommodate the amount of data the storage system may hold. For example, a testing system may store metadata, which is directly derived from the underlying data stored. This immediately implies that large enough storage systems may overwhelm an undersized testing system.

Computability refers to the desire of the testing systems, in optimal scenarios, to ascertain which data is stored in which place. Since data generated by a testing system directly affects what the testing system expects to find on the storage system, a testing system may compromise on the quality of written data in order to achieve better computability. For example, a testing system may generate predetermined patterns that encode logical block addresses (LBAs) in the block where the data is stored. This provides better computability because the data may be deduced directly from the LBA, and no other metadata is needed.

Scalability and computability measure the lifeline of the testing system. A testing system that lacks scalability may not sustain long runs or future or larger storage systems and components. A testing system that lacks computability may introduce performance issues in testing operations, and may not generate enough load in the storage system. To achieve better scalability and computability, designers compromise on the quality of the overall testing system.

To address the issues described above, the illustrated embodiments provide mechanisms for performing deterministic data verification in a highly scalable and computable manner. In one embodiment, the mechanisms of the present invention issue write tasks that are non-overlapping in nature. In the event two write tasks overlap and need to be sent at the same time, the latter task is delayed until the former is acknowledged.

Figure 1:
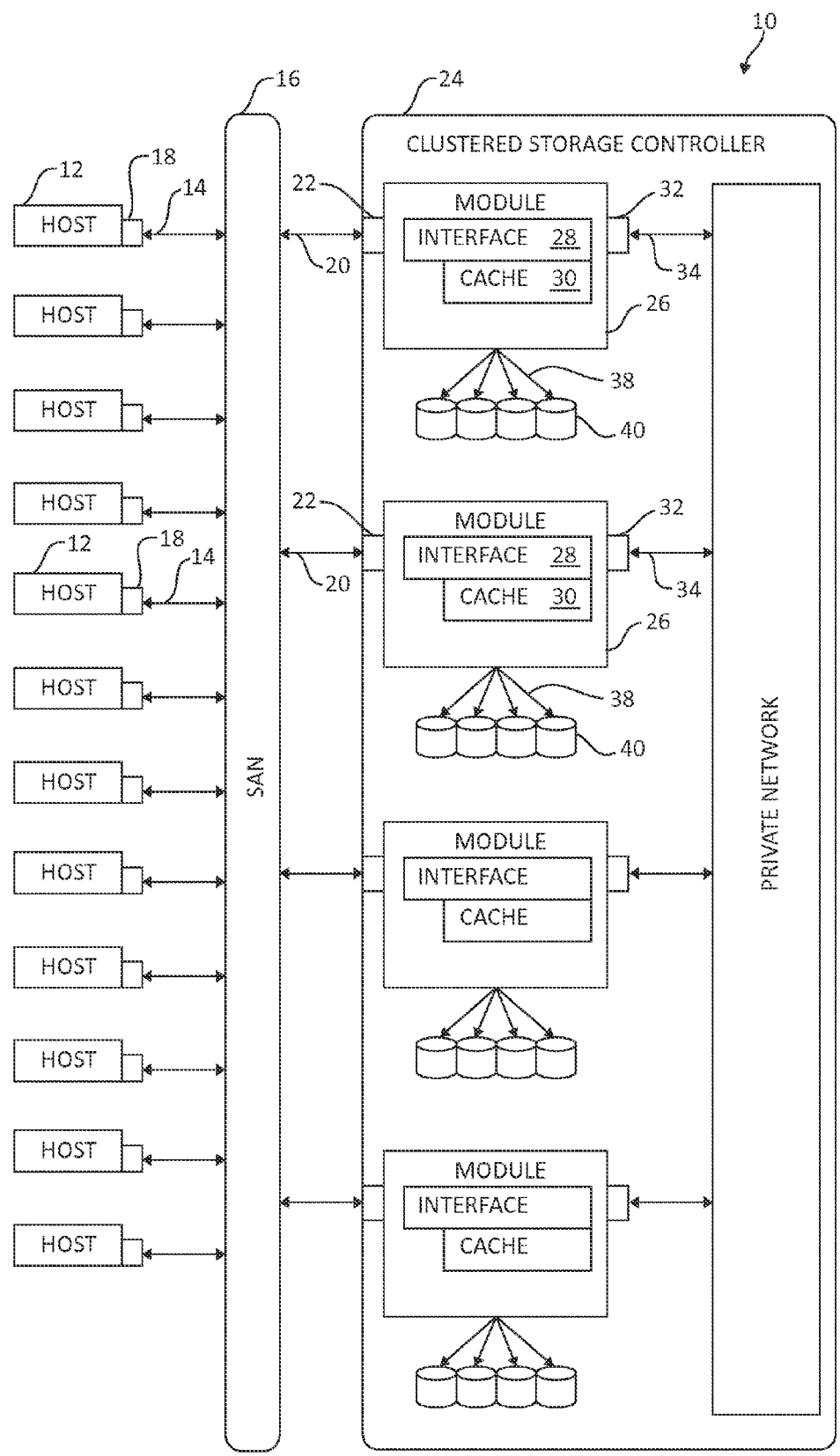
FIG. 1 is a block diagram of an exemplary computing storage environment in accordance with certain embodiments.

Turning now to the drawings, reference is initially made to FIG. 1, which is a block diagram of an exemplary data processing storage subsystem 10, in accordance with a disclosed embodiment of the invention. The particular subsystem shown in FIG. 1 is presented to facilitate an explanation of the invention. However, as the skilled artisan will appreciate, the invention can be practiced using other computing environments, such as other storage subsystems with diverse architectures and capabilities.

The storage subsystem 10 receives, from one or more host computers 12, input/output (I/O) requests, which are commands to read or write data at logical addresses on logical volumes. Any number of host computers 12 is coupled to the storage subsystem 10 by any means known in the art, for example, using a network. Herein, by way of example, the host computers 12 and the storage subsystem 10 are assumed to be coupled by a Storage Area Network (SAN) 16 incorporating data connections 14 and Host Bus Adapters (HBAs) 18. The logical addresses specify a range of data blocks within a logical volume, each block herein being assumed by way of example to contain 512 bytes. For example, a 10 KB data record used in a data processing application on a host computer would require 20 blocks, which the host computer might specify as being stored at a logical address comprising blocks 1000 through 1019 of a logical volume. The storage subsystem 10 typically operates in, or as, a network attached storage (NAS) or a SAN system.

The storage subsystem 10 comprises a clustered storage controller 24 coupled between the SAN 16 and private network 36 using data connections 20 and 34, respectively, and incorporating adapters 22 and 32, again respectively. Clustered storage controller 24 implements clusters of storage modules 26, each of whom includes an interface 28 (in communication between adapters 22 and 32), and a cache 30. Each storage module 26 is responsible for a number of disks 40 by way of data connection 38 as shown.

As described previously, each storage module 26 further comprises a cache 30. However, it will be appreciated that the number of caches used in the storage subsystem 10 and in conjunction with clustered storage controller 24 may be any convenient number. While all caches 30 in the storage subsystem 10 may operate in substantially the same manner and to comprise substantially similar elements, this is not a requirement. Each of the caches 30 is typically, but not necessarily approximately equal in size and is assumed to be coupled, by way of example, in a one-to-one correspondence with a set of physical storage units, which are typically disks. In one embodiment, the disks 40 may comprise such disks. Those skilled in the art will be able to adapt the description herein to caches of different sizes.

Each set of physical storage comprises multiple slow and/or fast access time mass storage devices, herein below assumed to be multiple hard disks. FIG. 1 shows the caches 30 coupled to respective sets of physical storage. Typically, the sets of physical storage comprise one or more disks 40, which can have different performance characteristics. In response to an I/O command, the cache 30, by way of example, may read or write data at addressable physical locations of physical storage. In the embodiment of FIG. 1, the caches 30 are shown to exercise certain control functions over the physical storage. These control functions may alternatively be realized by hardware devices such as disk controllers, which are linked to the caches 30.

Routing records, indicating the association of logical addresses of logical volumes with partitions and the association of the partitions with caches, are distributed by the SAN 16 to one or more generally similar network interfaces 28 of the storage modules 26. It will be understood that the storage subsystem 10, and thereby, the clustered storage controller 24, may comprise any convenient number of network interfaces 28. Subsequent to the formation of the disks 40, the network interfaces 28 receive I/O commands from the host computers 12 specifying logical addresses of the disks 40. The network interfaces use the routing records to break the commands into I/O instructions, or command subsets, that are then distributed among the caches 30.

Each storage module 26 is operative to monitor its state, including the states of associated caches 30, and to transmit configuration information to other components of the storage subsystem 10 for example, configuration changes that result in blocking intervals, or limit the rate at which I/O requests for the sets of physical storage are accepted.

Routing of commands and data from the HBAs 18 to the clustered storage controller 24 to each cache 30 is typically performed over a network and/or a switch. Herein, by way of example, the HBAs 18 may be coupled to the storage modules 26 by at least one switch (not shown) of the SAN 16, which can be of any known type having a digital cross-connect function. In addition, the HBAs 18 may be directly coupled to the storage modules 26 in an additional implementation.

Data having contiguous logical addresses are generally distributed among the disks 40. Alternatively, the data can be distributed using other algorithms, e.g., byte or block interleaving. In general, this increases bandwidth, for instance, by allowing a volume in a SAN or a file in network attached storage to be read from or written to more than one disk at a time. However, this technique requires coordination among the various disks, and in practice may require complex provisions for disk failure, and a strategy for dealing with error checking information, e.g., a technique for storing parity information relating to distributed data. Indeed, when logical unit partitions are distributed in sufficiently small granularity, data associated with a single logical unit may span all of the disks 40.

While not explicitly shown for purposes of illustrative simplicity, the skilled artisan will appreciate that in some embodiments, the clustered storage controller 24 may be adapted for implementation in conjunction with certain hardware, such as a rack mount system, a midplane, and/or a backplane. Indeed, the private network 36 in one embodiment may be implemented using a backplane. Additional hardware such as the aforementioned switches, processors, controllers, memory devices, and the like may also be incorporated into the clustered storage controller 24 and elsewhere within the storage subsystem 10, again as the skilled artisan will appreciate. Further, a variety of software components, operating systems, firmware, and the like may be integrated.

Figure 2:
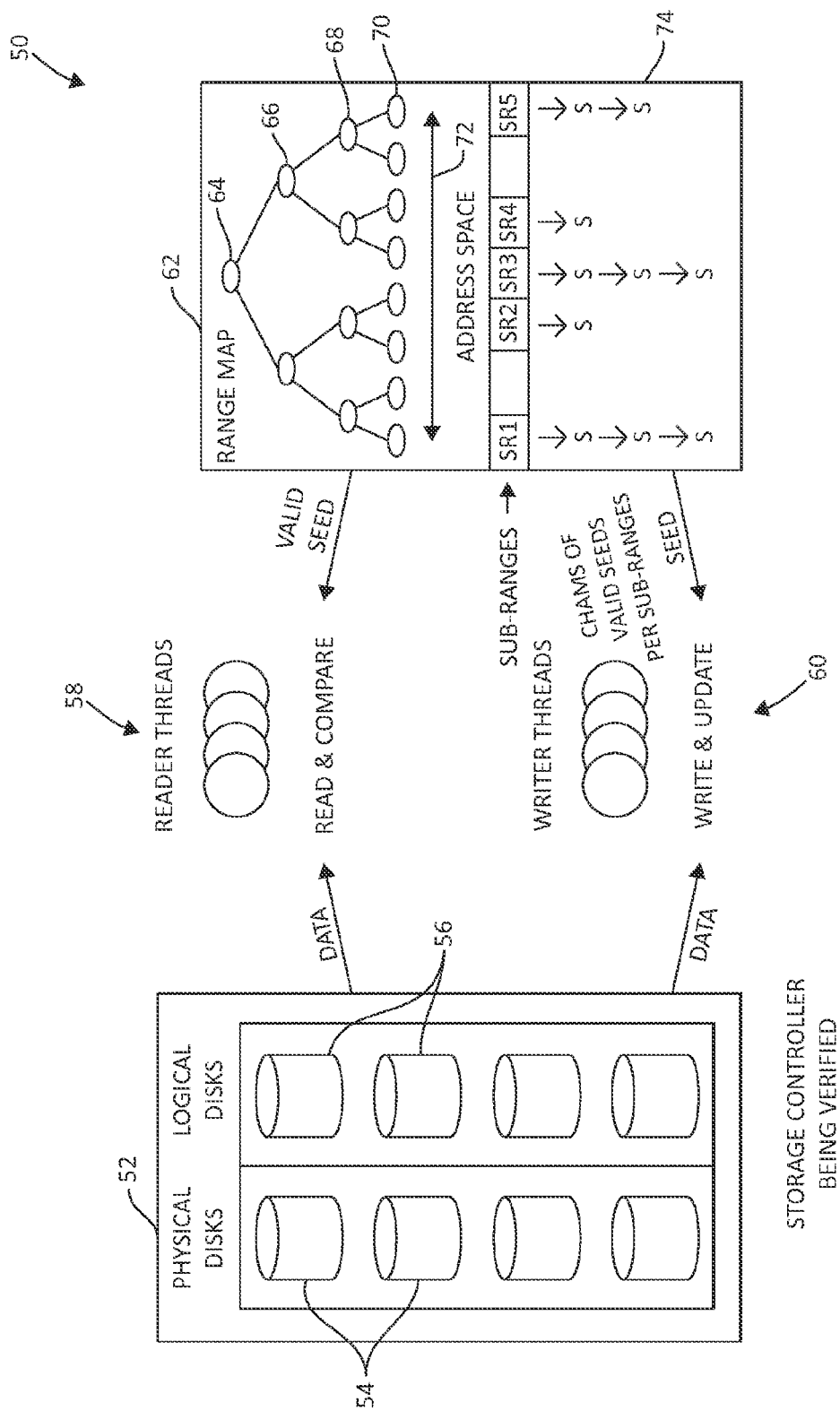
FIG. 2 is a block diagram of an exemplary process for performing deterministic data verification according to various aspects of the present invention.

Turning to FIG. 2, a block diagram of various functional elements describing an exemplary process 50 for performing deterministic data verification according to aspects of the present invention is illustrated. Process 50 includes at least a portion 52 of the storage controller 24 previously depicted (FIG. 1), including a set of physical storage devices (such as disks as shown) 54, and a set of corresponding logical storage devices 56. A set of parallel write threads 58 and 60 write/read data between the physical/logical disks as shown.

A range map 62 is depicted, which provides a lookup data structure of data ranges. An address space 72 in the range map 62 is represented by various nodes 64, 66, 68, and 70 of a hierarchical tree. Range map 62 is used to generate data seeds to compare against the written and read data to determine if the correct data is being sent to or retrieved from the storage controller 52 as will be further described. The seeds are organized into chains corresponding to various subranges of the address space/range map 74 as shown in table 74, and again as will be further described.

In one embodiment, users, or test-authors, may interact with a testing system by running jobs. A job may be defined as a set of input/output (I/O) operations or tasks to be sent to the storage system (such as the devices 54, 56). In a further embodiment, the tasks may exhibit a particular LBA range, a pattern (either sequential or random), and I/O type (read or write) and a unique identification (ID). Once begun, a job may generate and send tasks to the storage system until stopped by the user. Each I/O in the job may be numbered in an incrementing sequential number, which in one embodiment may start with 0 and be referred in short as a tasknum.

It is beneficial to note that once a job is created, the LBAs of the tasks to be sent to the storage system are known in advance. For example, when a job is started that ranges from LBA 0 to LBA 9, with an I/O size of 1 block and a sequential pattern, a pattern of tasks 80 is obtained as shown in FIG. 3, following.

Figure 3:
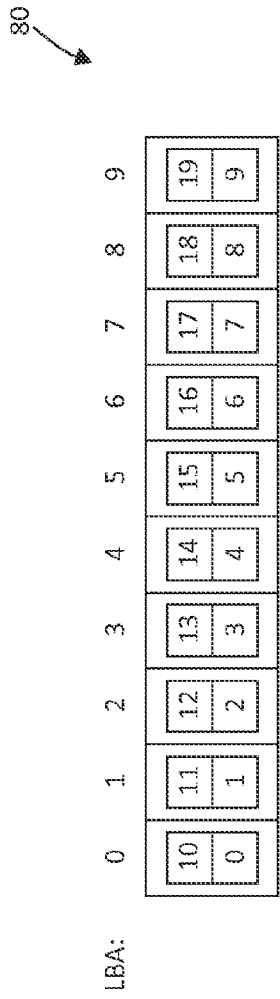
FIG. 3 is a block diagram of exemplary logical block addresses (LBAs)

In view of FIG. 3, read tasks may be sent to a storage unit (such as a logical volume) in any order, as reads do not affect the state of the storage device but sample the device. For example, a read task that reads from LBA 0-10 and another read task that reads from LBA 5-15 may be scheduled in parallel. Similarly, if two read jobs are defined as J0 and J1, tasks may be sent in the following exemplary order:

J0/0, then J1/0, and then J0/1
J0/0, then J0/1, and then J1/1.

In general, the scheduling of read jobs/tasks may be flexibly implemented.

In order to be able to read and correctly verify information obtained from the volume, write tasks must be sent in a predetermined order. Accordingly, determinations need to be made as to how to schedule write tasks of all active write jobs once a write job has started. For example, a volume having two active write jobs may schedule the write tasks in a round-robin manner, such as J0/0, J1/0, J0/1, J1/1, J0/2, J1/2, . . . , etc. Once an implementation is made scheduling write jobs in a particular order, write tasks from all associated write jobs must also be scheduled in the same order. This scheduling allows for reverse-lookups to determine an exact write task that wrote on a particular LBA, for example.

In association with write-scheduling activity, whenever a write task is to be scheduled, a determination should be made if the write task overlaps with a currently active write task. In case the write task to be sent overlaps or collides with another active write task, the newer task should be delayed until the overlapping task is acknowledged. Once the overlapping task is acknowledged, the second tasks that writes to that particular address may then be sent. Such logic becomes important because if writes are not enforced to occur in a chronological order, the data on the storage device could not be determined.

Each write task sent to the storage system should carry data to be written. In one embodiment, the data is generated based on a unique identification of the job and the tasknum previously described. The unique id and the tasknum are hashed pursuant to application by a hash function. The hashed results are then XORed, resulting in a data seed for that specific write task. This data seed is then used to generate pseudo random data in each address portion (e.g., block) of the write task.

Figure 4:
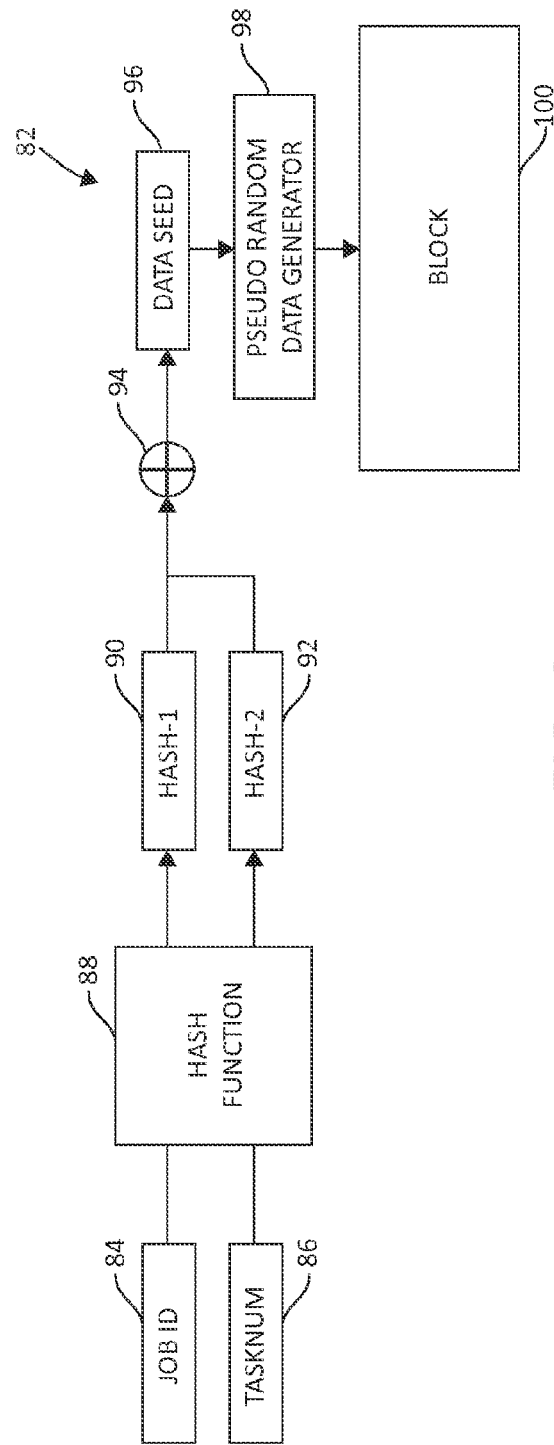
FIG. 4 is a block diagram of various exemplary functional elements of performing deterministic data verification according to aspects of the present invention.

FIG. 4, following, is a block diagram illustrating the exemplary embodiment just described. Blocks 84 and 86 represent the job id and tasknum information, which is provided to a hash function 88 to generate hash-1 (block 90) and hash-2 (block 92). Each hash result is fed to XOR function 94 to generate data seed 96. The data seed 96 is provided to pseudo random data generator 98 to generate pseudo random data for a particular block 100.

By selecting an appropriate hash function, each write task generates a set of unique data using a replicable process. Since the job id is unique, and the tasknums are known, by knowing which pair of job id+tasknum wrote to which LBA, for example, it is possible to regenerate the data that was written to that particular LBA.

For every storage unit in the storage system, the range map stores the history of data seeds associated with all write jobs that ever started on the volume in a manner allowing, for each LBA, the determination of the pair of job+tasknum identification that committed the last write on that LBA. This is possible because every write job is just a set of known-in-advance tasks, and the jobs' tasks are scheduled in a known-in-advance order, which might change when jobs are started or stopped, but is still predictable. One of ordinary skill in the art will appreciate that other data structures and journals may be implemented in similar fashion in other embodiments to generate a record of write activity. In this sense, the term "range map" may refer to and describe any number of data structures used to generate a historical record of write activity.

This history seeking can be efficiently implemented in the two pattern types discussed above. For the aforementioned sequential patterns, back-tracking the cycles of the interval may be performed, checking if the address range sought is found within that cycle. For random patterns, a random engine may be selected that is backwards searchable.

In this environment, each read task may turn to the range map and query associated data seeds to compare against the data found on the storage device. In one embodiment, when a read task begins, the mechanisms of the present invention seek for the last pair of job+tasknum information that wrote anywhere on the range of the read task. In one embodiment, this may be determined by querying the range map and obtaining the associated data seed. Once this pair is determined, the overlapping range between that of the read task and that of the option (job+tasknum) is calculated, and the option is used as the data expected to be found on the volume at that range. The process is continued recursively until the entire read task is resolved.

Figure 5:
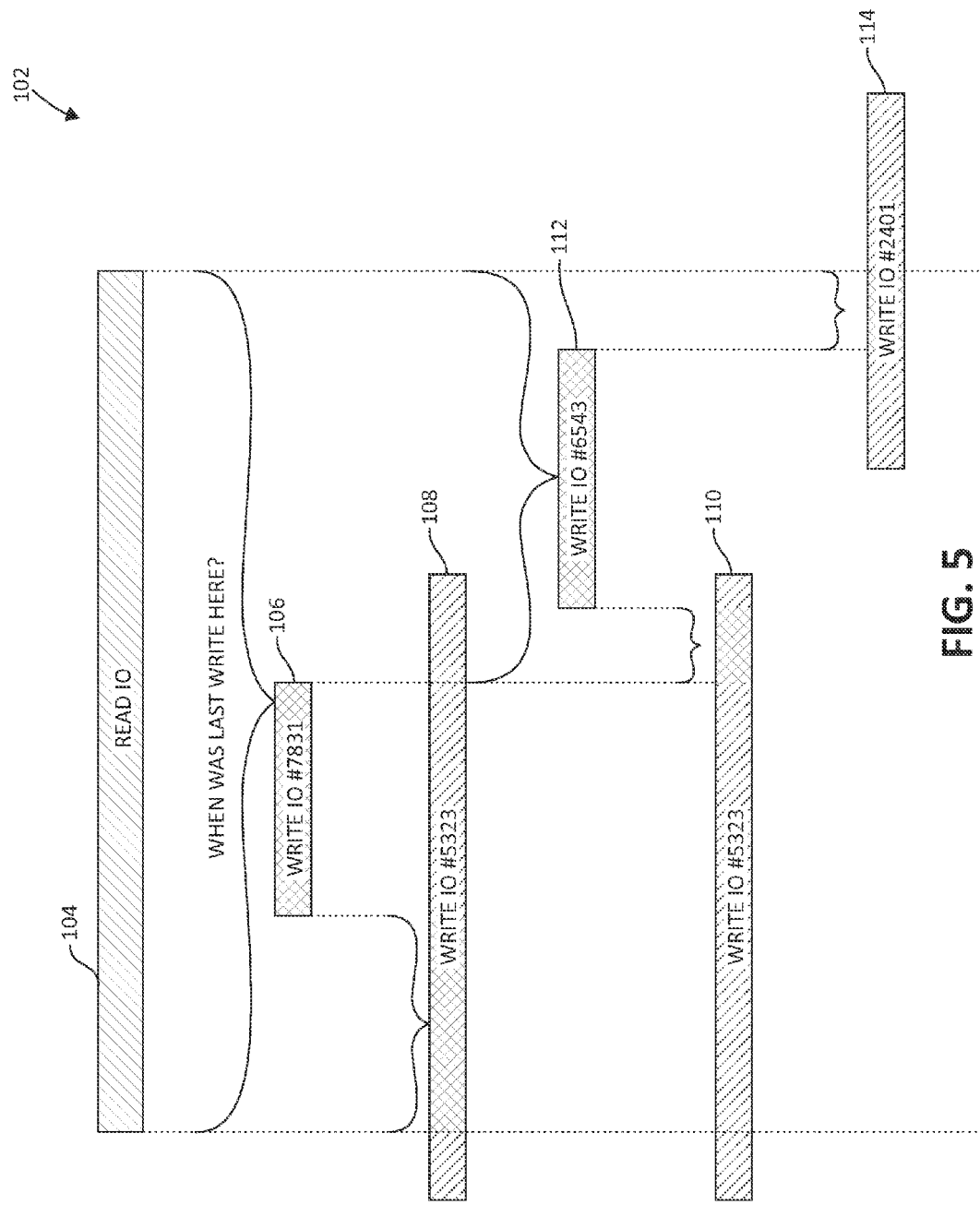
FIG. 5 is a block diagram of an exemplary process of resolving read tasks according to aspects of the present invention.

Turning to FIG. 5, an exemplary recursive process 102 for resolving read tasks is depicted for a particular read I/O 104. Write I/O segment 106 is identified as the last write in the read I/O 104 as shown by seeking the last pair of job+tasknum information as previously described. In the next recursion, write I/O segment 108 is located, followed recursively by segments 112, 110, and 114, which collectively construct the entire read I/O 104 and the read task is resolved.

Figure 6:
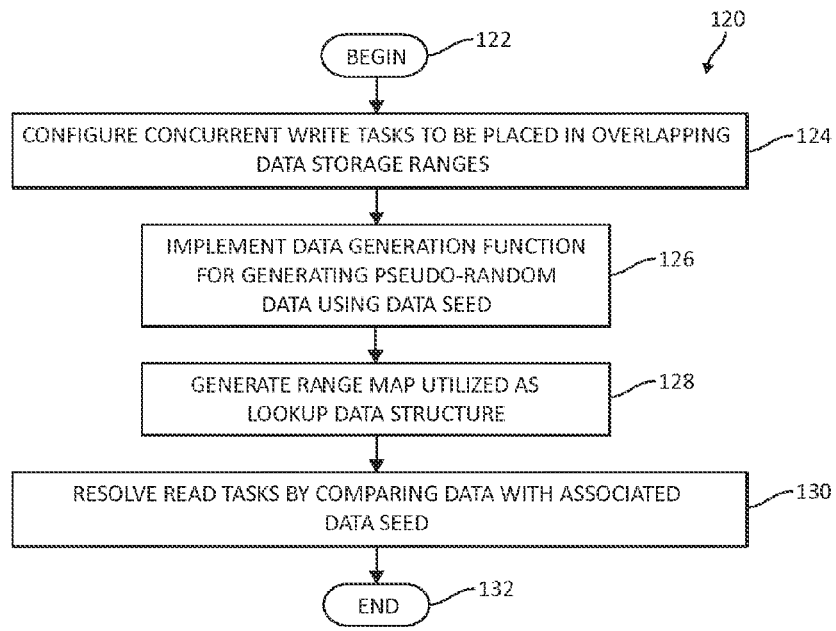
FIG. 6 is a flow chart diagram of an exemplary method for performing deterministic data verification according to aspects of the present invention.
Figure 7:
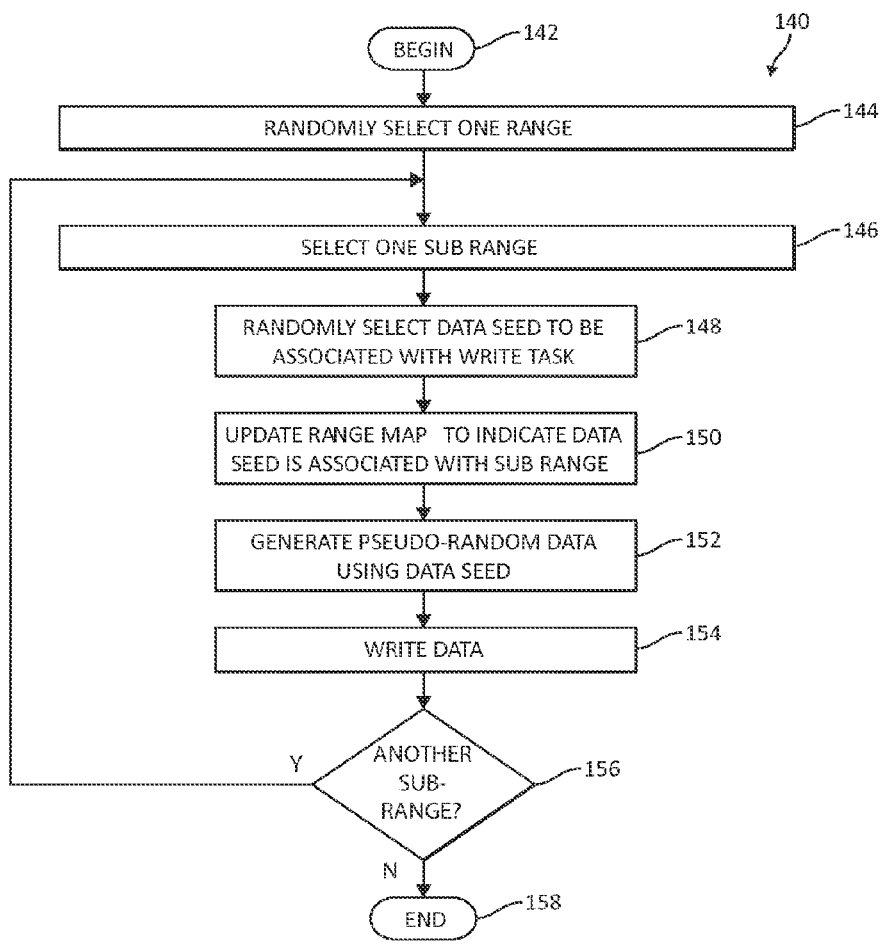
FIG. 7 is a flow chart diagram of an exemplary method for writing data pursuant to performing deterministic data verification according to aspects of the present invention.
Figure 8:
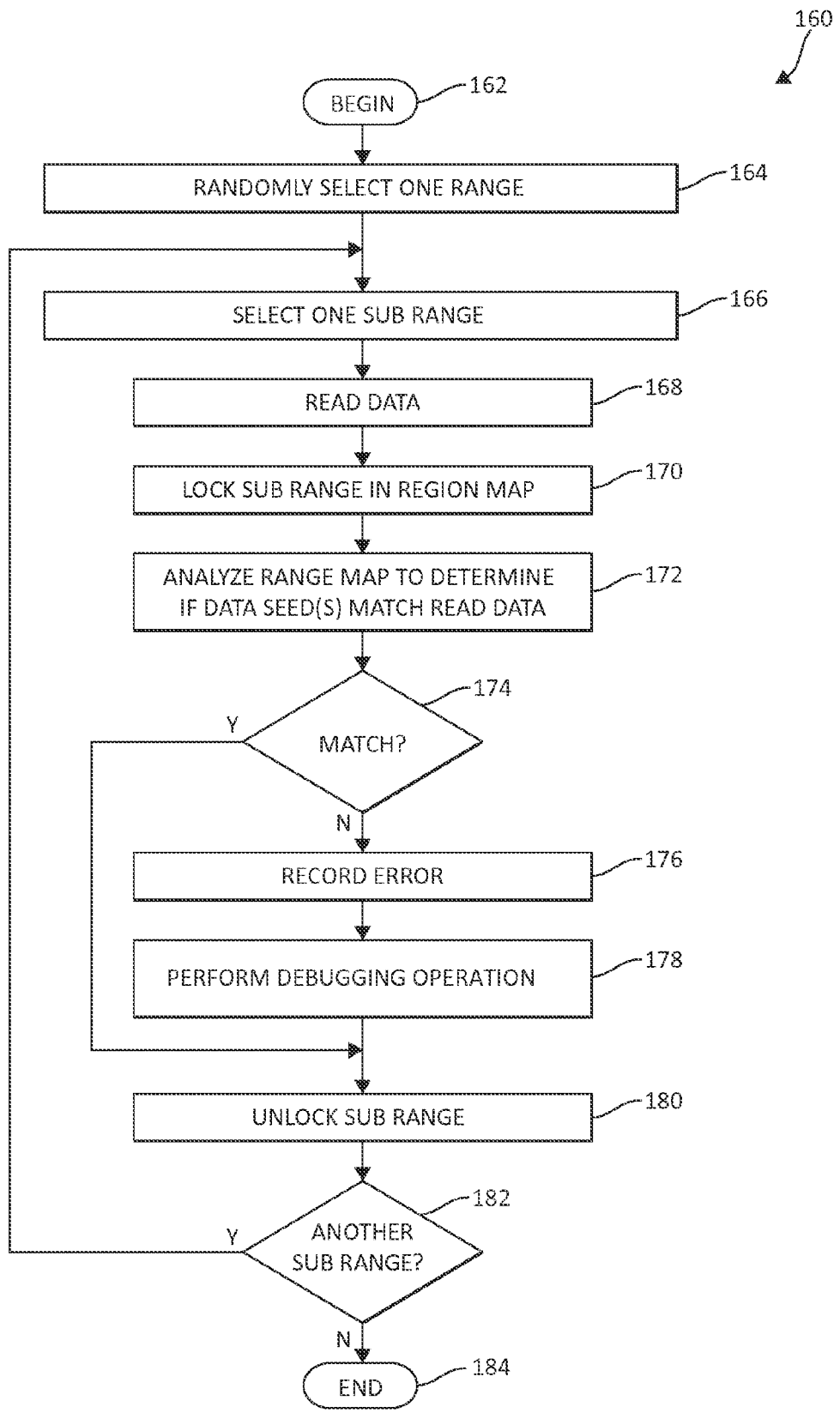
FIG. 8 is a flow chart diagram of an exemplary method for reading data pursuant to performing deterministic data verification according to aspects of the prevent invention.

FIGS. 6, 7, and 8, following, illustrate flow-chart diagrams of exemplary methods 120, 140, and 160 for performing deterministic data verification according to aspects of the present invention. As one of ordinary skill in the art will appreciate, various steps in the methods 120, 140, and 160 may be implemented in differing ways to suit a particular application. In addition, the described methods may be implemented by various means, such as hardware, software, firmware, or a combination thereof operational on or otherwise associated with the computing storage environment. For example, the methods may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

Turning first to FIG. 6, method 120 illustrates an exemplary process for performing deterministic data verification. Method 120 begins (step 122) with the configuration of a number of concurrent write tasks to be placed in overlapping data storage ranges (step 124) by implementing a data generation function for generating pseudo-random data using a data seed as previously described (step 126), and by generating a range map used as a lookup data structure (step 128). Method 120 then resolves read tasks by comparing data against the associated data seed (step 130). Method 120 then ends (step 132).

Turning to FIG. 7, method 140 illustrates an exemplary write process implemented in view of the method 120 in FIG. 6. Method 140 begins (step 142) with the random selection of a data range in which to write the data (step 144). Within the data range, a sub range is selected (step 146). For the selected sub range, a data seed is randomly selected/generated to be associated with the write task (step 148). The range map is updated to indicate the data seed is associated with the selected sub range (step 150). Pseudo-random data is generated using the data seed (step 152), and the pseudo-random data is written (step 154). If another sub range need be selected (step 156), the method 140 returns to step 146 to repeat steps 148-154. Once each sub range is addressed, the method 120 ends (step 158).

Turning to FIG. 8, method 160 illustrates an exemplary write process implemented in view of the method 120 in FIG. 6. Method 160 begins (step 162) with the random selection of a data range to read from (step 164). Within the selected data range, a sub range is selected (step 166). For the selected sub range, the data is first read (step 168). The sub range is locked in the range map (step 170). The range map is analyzed to determine if one or more data seeds match the read data (step 172).

If a match is found (step 174), the sub range is unlocked (step 182), and the method 160 queries if another sub range is to be read (step 182). If this is the case, the method 160 returns to step 166 to select an additional sub range, and repeats the steps 168-180. Returning to step 174, if a match is not found, an error is recorded (step 176), the error is debugged (step 178), and the method 160 proceeds to step 180 as described previously.

In an alternative embodiment, the range map may be implemented as a tree of ranges. Each node in the tree may represent a range from a starting offset to an ending offset, with a separate tree for each storage unit (again such as a volume). The final leaf in the tree may be configured to be a range of data segments (such as blocks) denoted by the starting sector address and the ending sector address. When a write task is initiated, the tree may either update, split a range of an address in two, or split to three address ranges (assuming the written area is found completely within an existing range). Merging of ranges may take place when two adjacent ranges have the same starting seed.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method for performing deterministic data verification by a storage controller operational in a computing storage environment, comprising:
configuring each of a plurality of concurrent write tasks to be placed in a plurality of overlapping data storage ranges by:
implementing a data generation function for generating pseudo-random data using a data seed, and
generating a range map, the range map utilized as a lookup data structure to verify a chronological order for performing the plurality of concurrent write tasks, wherein a data address space is first designated in the range map as undetermined, the generating including generating a plurality of nodes, wherein each node represents a range from a starting address offset to an ending address offset; and
analyzing each of a plurality of read tasks by comparing data read from a sub range in the plurality of overlapping data storage ranges against the data seed associated with the sub range.

2. The method of claim 1, wherein implementing a data generation function and generating a range map includes:
selecting one range of the plurality of overlapping data storage ranges, and
for each of a plurality of sub ranges in the one range:
selecting a data seed to be associated with a particular write task,
generating the pseudo-random data using the data seed, and
writing the pseudo-random data.

3. The method of claim 1, wherein analyzing each of the plurality of read tasks includes:
selecting one range of the plurality of overlapping data storage ranges, and
for each of a plurality of sub ranges in the one range:
reading the data,
locking the sub range in the range map,
analyzing the range map to determine if at least one data seed matches the data, and
unlocking the sub range.

4. The method of claim 3, wherein if the one data seed does not match the data, recording an error.

5. The method of claim 1, wherein implementing a data generation function for generating pseudo-random data using a data seed includes implementing at least one hash table having a linked list of possible matching at least one of the sub range and additional sub ranges in the plurality of overlapping data storage ranges to determine at least one of the data seed and additional data seeds.

6. The method of claim 5, wherein implementing the at least one hash table includes implementing a hash function to transform at least one of a job identification (ID) and task number associated with one of the plurality of concurrent write tasks.

7. The method of claim 1, wherein generating the range map includes implementing a tree of address ranges including the plurality of nodes.

8. A system for performing deterministic data verification in a computing storage environment, comprising:
a memory; and
a storage controller including a processing device coupled to the memory and operational in the computing storage environment, wherein the storage controller is adapted for configuring each of a plurality of concurrent write tasks to be placed in a plurality of overlapping data storage ranges by:
implementing a data generation function for generating pseudo-random data using a data seed, and
generating a range map, the range map utilized as a lookup data structure to verify a chronological order for performing the plurality of concurrent write tasks, wherein a data address space is first designated in the range map as undetermined, the generating including generating a plurality of nodes, wherein each node represents a range from a starting address offset to an ending address offset; and
analyzing each of a plurality of read tasks by comparing data read from a sub range in the plurality of overlapping data storage ranges against the data seed associated with the sub range.

9. The system of claim 8, wherein the storage controller is further adapted for, pursuant to implementing a data generation function and generating a range map:

selecting one range of the plurality of overlapping data storage ranges, and for each of a plurality of sub ranges in the one range:
selecting a data seed to be associated with a particular write task,
generating the pseudo-random data using the data seed, and
writing the pseudo-random data.

10. The system of claim 8, wherein the storage controller is further adapted for, pursuant to analyzing each of the plurality of read tasks:

selecting one range of the plurality of overlapping data storage ranges, and for each of a plurality of sub ranges in the one range:
reading the data,
locking the sub range in the range map,
analyzing the range map to determine if at least one data seed matches the data, and
unlocking the sub range.

11. The system of claim 10, wherein the storage controller is further adapted for, if the one data seed does not match the data, recording an error.

12. The system of claim 8, wherein the storage controller is further adapted for, pursuant to implementing a data generation function for generating pseudo-random data using a data seed, implementing at least one hash table having a linked list of possible matching at least one of the sub range and additional sub ranges in the plurality of overlapping data storage ranges to determine at least one of the data seed and additional data seeds.

13. The system of claim 12, wherein the storage controller is further adapted for, pursuant to implementing the at least one hash table, implementing a hash function to transform at least one of a job identification (ID) and task number associated with one of the plurality of concurrent write tasks.

14. The system of claim 8, wherein the storage controller is further adapted for, pursuant to generating the range map, implementing a tree of address ranges including the plurality of nodes.

15. A computer program product for performing deterministic data verification by a storage controller operational in a computing storage environment, the computer program product comprising a non-transitory computer-readable storage medium having computer-readable program code portions stored therein, the computer-readable program code portions comprising:

a first executable portion for configuring each of a plurality of concurrent write tasks to be placed in a plurality of overlapping data storage ranges by:
implementing a data generation function for generating pseudo-random data using a data seed, and
generating a range map, the range map utilized as a lookup data structure to verify a chronological order for performing the plurality of concurrent write tasks, wherein a data address space is first designated in the range map as undetermined, the generating including generating a plurality of nodes, wherein each node represents a range from a starting address offset to an ending address offset; and a second executable portion for analyzing each of a plurality of read tasks by comparing data read from a sub range in the plurality of overlapping data storage ranges against the data seed associated with the sub range.

16. The computer program product of claim 15, further including a third executable portion for, pursuant to implementing a data generation function and generating a range map:

selecting one range of the plurality of overlapping data storage ranges, and for each of a plurality of sub ranges in the one range:
selecting a data seed to be associated with a particular write task,
updating the range map to indicate that the data seed is associated with one of the plurality of sub ranges,
generating the pseudo-random data using the data seed, and
writing the pseudo-random data.

17. The computer program product of claim 15, further including a third executable portion for, pursuant to analyzing each of the plurality of read tasks:

selecting one range of the plurality of overlapping data storage ranges, and for each of a plurality of sub ranges in the one range:
reading the data,
locking the sub range in the range map,
analyzing the range map to determine if at least one data seed matches the data, and
unlocking the sub range.

18. The computer program product of claim 17, further including a fourth executable portion for, if the one data seed does not match the data, recording an error.

19. The computer program product of claim 15, further including a third executable portion for, pursuant to implementing a data generation function for generating pseudo-random data using a data seed, implementing at least one hash table having a linked list of possible matching at least one of the sub range and additional sub ranges in the plurality of overlapping data storage ranges to determine at least one of the data seed and additional data seeds.

20. The computer program product of claim 19, further including a fourth executable portion for, pursuant to implementing the at least one hash table, implementing a hash function to transform at least one of a job identification (ID) and task number associated with one of the plurality of concurrent write tasks.

* * * * *